United States Patent
Alasfour

(10) Patent No.: US 8,956,102 B2
(45) Date of Patent: Feb. 17, 2015

(54) VEHICLE WITH WHEELCHAIR POSITIONING MECHANISM

(71) Applicant: Faisal A. O. Alasfour, Alsheab (KW)

(72) Inventor: Faisal A. O. Alasfour, Alsheab (KW)

( * ) Notice: Subject to any disclaimer, the term of this patent is extended or adjusted under 35 U.S.C. 154(b) by 0 days.

(21) Appl. No.: 14/165,257

(22) Filed: Jan. 27, 2014

(65) Prior Publication Data

US 2014/0219753 A1    Aug. 7, 2014

Related U.S. Application Data

(63) Continuation-in-part of application No. 13/760,016, filed on Feb. 5, 2013, now abandoned.

(51) Int. Cl.
| | | |
|---|---|---|
| *B60P 3/06* | (2006.01) | |
| *B60P 7/08* | (2006.01) | |
| *A61G 3/06* | (2006.01) | |
| *A61G 3/08* | (2006.01) | |
| *B60P 1/44* | (2006.01) | |

(52) U.S. Cl.
CPC ............... *A61G 3/062* (2013.01); *A61G 3/0808* (2013.01); *B60P 1/4457* (2013.01); *B60P 3/06* (2013.01); *B60P 1/4414* (2013.01); *Y10S 414/134* (2013.01)
USPC .................. 414/541; 104/45; 410/7; 410/67; 414/921

(58) Field of Classification Search
USPC ..................... 104/45; 410/7, 67; 414/541, 921
See application file for complete search history.

(56) References Cited

U.S. PATENT DOCUMENTS

| | | | | |
|---|---|---|---|---|
| 3,476,404 | A | * | 11/1969 | Rachman .......................... 280/30 |
| 4,121,695 | A | * | 10/1978 | Carpenter ...................... 414/539 |
| 4,671,730 | A | | 6/1987 | Gateau |
| 4,805,954 | A | * | 2/1989 | Lazaroff ........................... 410/7 |
| 5,135,350 | A | * | 8/1992 | Eelman et al. ................. 414/921 |
| 5,628,595 | A | * | 5/1997 | Harris ................................ 410/7 |
| 6,685,403 | B2 | * | 2/2004 | Constantin ......................... 410/7 |
| 7,726,446 | B1 | * | 6/2010 | Buchanan et al. ............. 182/127 |
| 8,113,760 | B1 | | 2/2012 | Schroll |

FOREIGN PATENT DOCUMENTS

| | | | | | |
|---|---|---|---|---|---|
| FR | | 2726182 A1 | * | 5/1996 | ............... A61G 3/06 |
| GB | | 2402629 A | * | 12/2004 | ............... A63G 9/00 |

* cited by examiner

*Primary Examiner* — James Keenan
(74) *Attorney, Agent, or Firm* — Richard C Litman

(57) ABSTRACT

The vehicle with wheelchair positioning mechanism includes an automotive vehicle that is modified to assist a disabled person to enter, operate and exit the vehicle. The modification includes a wheelchair lift adjacent the rear of the vehicle. An internal rail system extends from the rear of the vehicle to the front of the vehicle adjacent the vehicle's driving controls. A remotely controlled platform is rotatably mounted on a carriage for movement on the rail system. The platform is adapted to support a wheelchair thereon. The platform can be rotated 360° so that the wheelchair moves forward when entering and exiting the vehicle.

8 Claims, 7 Drawing Sheets

US 8,956,102 B2

VEHICLE WITH WHEELCHAIR POSITIONING MECHANISM

CROSS-REFERENCE TO RELATED APPLICATION

This application is a continuation-in-part of U.S. patent application Ser. No. 13/760,016, filed on Feb. 5, 2013, now abandoned.

BACKGROUND OF THE INVENTION

1. Field of the Invention

The present invention generally relates to automotive vehicle modifications, and particularly to a vehicle with a wheelchair retention system that provides an automotive vehicle modified to accommodate a disabled person who utilizes a wheelchair.

2. Description of the Related Art

Many disabled people utilize wheelchairs to move about. Although limited in leg and/or feet functions, some of these disabled people retain the ability to drive an automotive vehicle. Unfortunately, attaining access to the driver's compartment of the vehicle has proven to be a daunting task in that the disabled person must be transferred from the wheelchair to the driving compartment and the wheelchair must then be folded and stowed in the vehicle for later use. Exiting the vehicle would require the reverse of the above-described procedure. This scenario almost always requires the need of a second person to lend assistance. There are disclosures in the related art that attempt alleviate the above-stated situations. These disclosures, however, have proven to be inefficient and cumbersome, especially in the vehicle exiting techniques. The art would certainly welcome a vehicle modification that would allow a wheelchair bound person to efficiently and safely enter and exit a vehicle without assistance from another person, Thus, a vehicle with a wheelchair positioning mechanism solving the aforementioned problems is desired.

SUMMARY OF THE INVENTION

The vehicle with wheelchair positioning mechanism is an automotive vehicle that is modified to assist a disabled person to enter, operate and exit. The modification comprises a wheelchair lift adjacent the rear of the vehicle. An internal rail system extends from the rear of the vehicle to the front of the vehicle adjacent the vehicle's driving controls. A remotely controlled platform is mounted for movement on the rail system. The platform is adapted to support a wheelchair thereon. The platform can be rotated 360° so that the wheelchair moves forward when entering and exiting the vehicle.

Accordingly, the invention presents an automotive vehicle that is modified with a system that allows a wheelchair bound person to enter, drive and exit the vehicle without assistance from another person. The system is, safe, easy to use and reliable. The invention provides for improved elements thereof in an arrangement for the purposes described that are inexpensive, dependable and fully effective in accomplishing their intended purposes.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
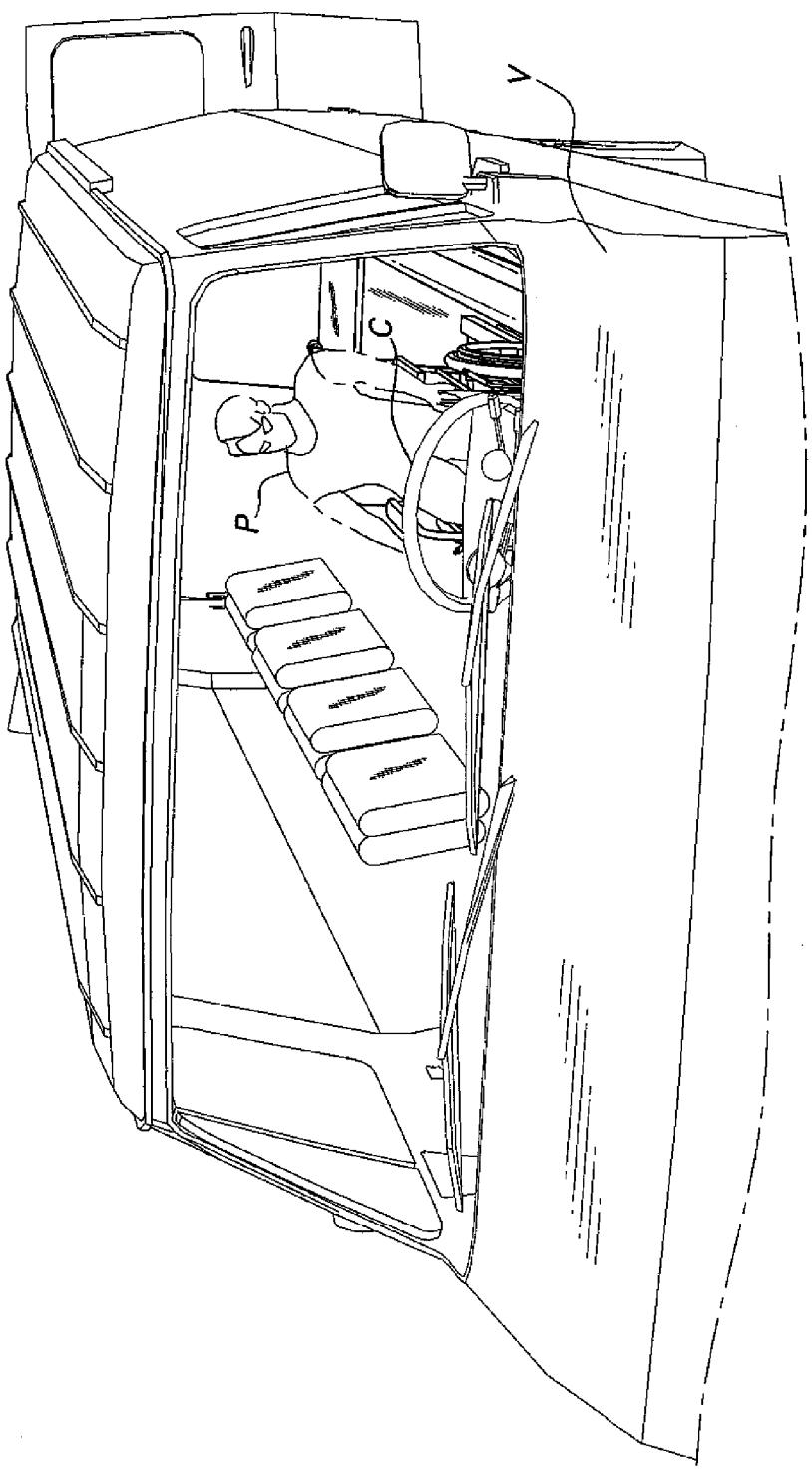
FIG. 1 is an environmental, perspective view of a vehicle with a wheelchair-positioning mechanism according to the present invention.
Figure 2:
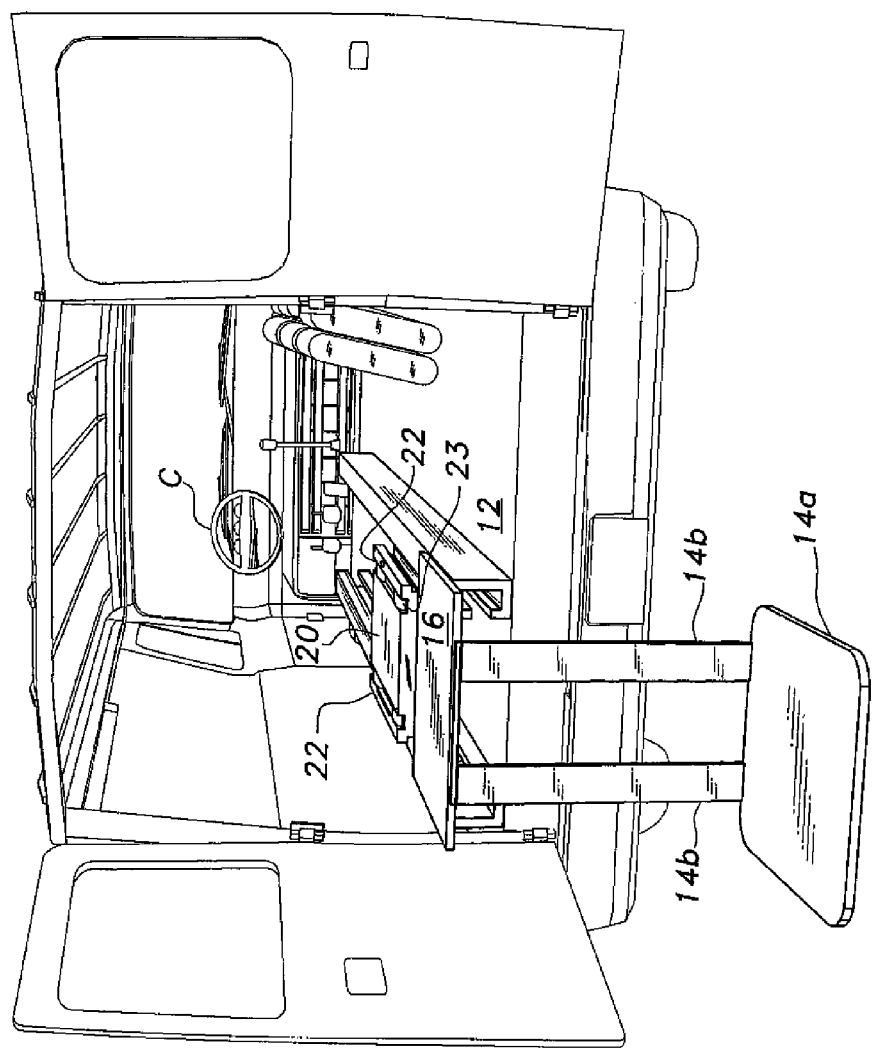
FIG. 2 is a rear perspective view of a vehicle with wheelchair-positioning mechanism of FIG. 1, shown with the wheelchair lift in a lowered position.
Figure 3:
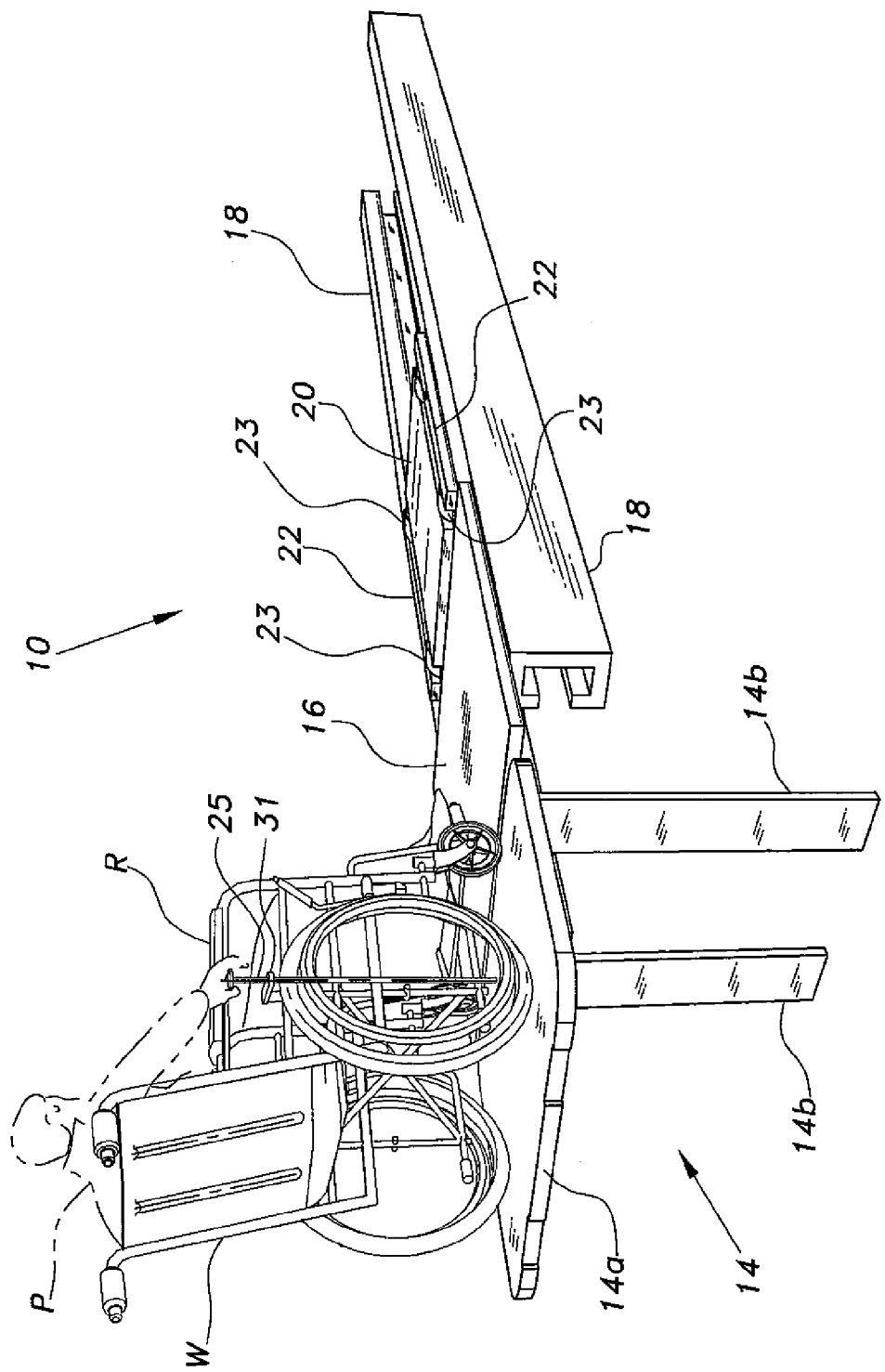
FIG. 3 is a partial, perspective view of the wheelchair-positioning mechanism of FIG. 2, shown with the vehicle omitted and with the wheelchair lift in a raised position.

With reference to FIGS. 1-7 of the drawings, the vehicle with wheelchair positioning mechanism includes a wheelchair-positioning mechanism, generally indicated at 10, that functions to move a wheelchair bound person P to the drivers position (FIG. 1) in a modified van-type vehicle V. The vehicle compartment has been modified to include a cleared floor area 12 that extends from the rear of the vehicle to a position adjacent the driving controls C of the vehicle. The mechanism 10 comprises a chair lift apparatus located at the rear of the vehicle and generally indicated at 14. Chair lift apparatus 14 includes a loading platform 14a disposed for vertical movement on risers 14b. Loading platform 14a is movable from a lower position at ground or street level (FIG. 2) to an upper position level with an off-loading ramp 16 (FIG. 3). A pair of spaced C-shaped rails 18 extends from the rear of the vehicle V to an area adjacent the driving control area, the rails 18 being fixed to the floor 12 of the vehicle V. A wheelchair receiving platform 20 is mounted on the rails for movement thereon from the rear of the vehicle to the driving control area. The wheelchair receiving platform 20 has an upper surface provided with spaced longitudinal grooves 22, which are spaced apart a width adapted to receive the rear wheels of a conventional wheelchair therein. Protuberances (best seen in FIGS. 2 and 3) formed as semi-cylinders 23 (similar in configuration to speed bumps) are positioned at each end of each groove 22 to prevent the wheelchair from easily rolling out of grooves 22, while permitting the wheels of the chair to enter the grooves 22 with a minimum amount of force.

Figure 4:
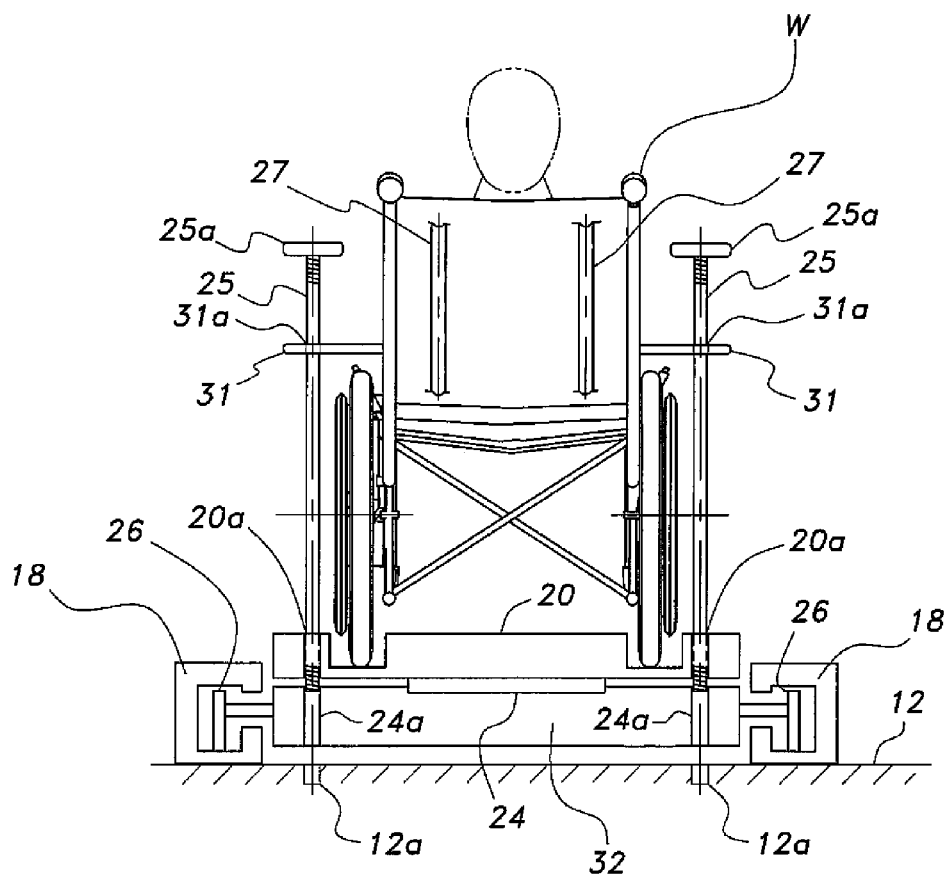
FIG. 4 is a diagrammatic partial rear view of the wheelchair-positioning mechanism of FIG. 2, shown with the vehicle omitted and with the stabilizing bars partially inserted.

As best seen in FIG. 4, the lower surface of platform 20 is mounted to a motorized member 24 disposed on a motorized trolley or carriage 32 having wheels 26 mounted thereto. The wheels 26 are positioned in the C-shaped rails and are movable therein, constraining the trolley or carriage 32 to linear movement forward and rearward in the vehicle compartment. The platform 20 is mounted to motorized member 24 for 360° rotation thereon in a horizontal plane. A pair of stabilizing bars 25 is provided to further restrict movement and enhance safety when the wheelchair and platform 20 are positioned adjacent the driving controls C of the vehicle. The stabilizing bars 25 are elongate cylinders having exterior threads provided at least at their upper and lower ends. A respective handle member 25a defines the upper end of each stabilizing bar 25. Respective stabilizing bar receiving members 31 are positioned on each side of the wheelchair and attached thereto. Members 31 are provided with respective openings 31a for receiving a respective stabilizing bar therethrough. Respective openings 20a, 24a are formed through the platform 20 and the trolley or carriage. Respective openings 20a, 24a are vertically aligned with respective openings 31a. When platform 20 is in the driver's position adjacent the controls, openings 31a, 20a and 24a are vertically aligned with threaded openings 12a formed in the floor 12 of the vehicle V. This arrangement permits the stabilizing bars 25 to be inserted through members 31, platform 20, and the trolley or carriage 32, and then threaded into openings 12a in the floor 12 of the vehicle V to further secure the wheelchair in a stable position. When not in use, the stabilizing bars may be housed in receptacles 27, which are mounted on the back of the wheelchair.

The lift apparatus can be folded (FIG. 6) when not in use. The entire system, including the rear doors of the van, is operated by a handheld or wheelchair mounted remote control device R.

Figure 5:
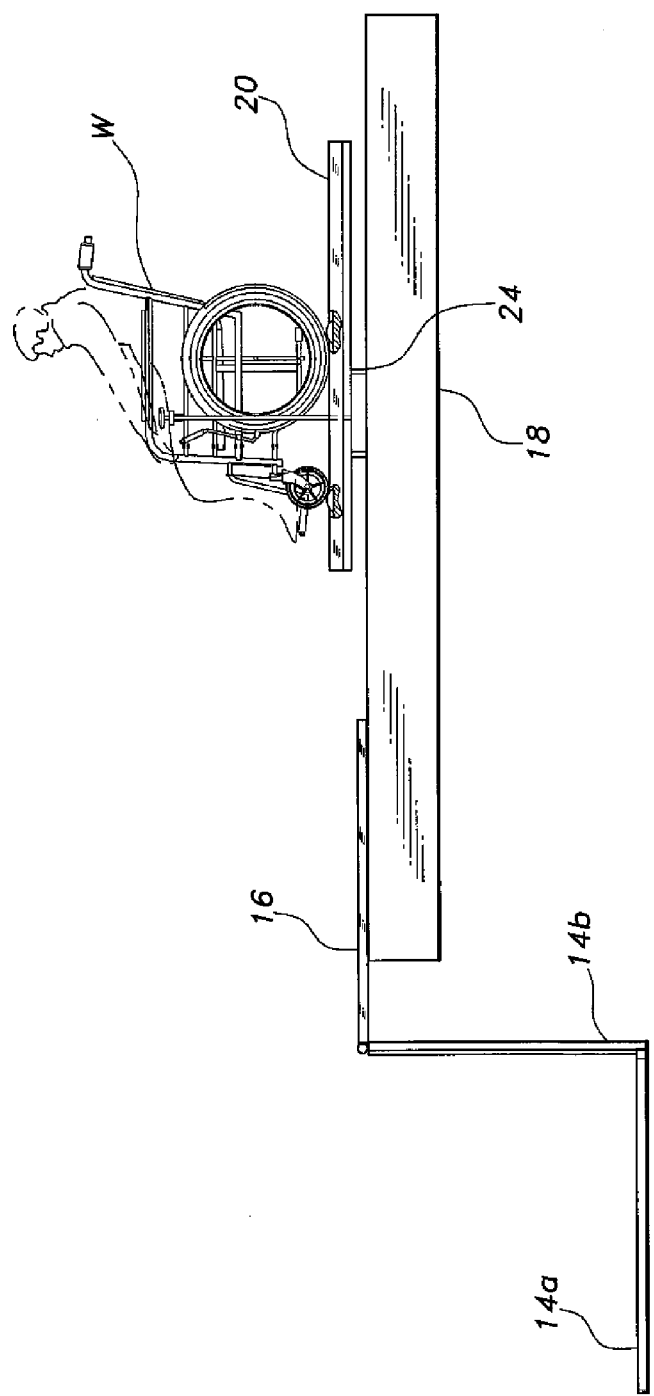
FIG. 5 is a diagrammatic partial side view of the wheelchair-positioning mechanism of FIG. 2, shown with the wheelchair platform rotated for exiting the vehicle.
Figure 6:
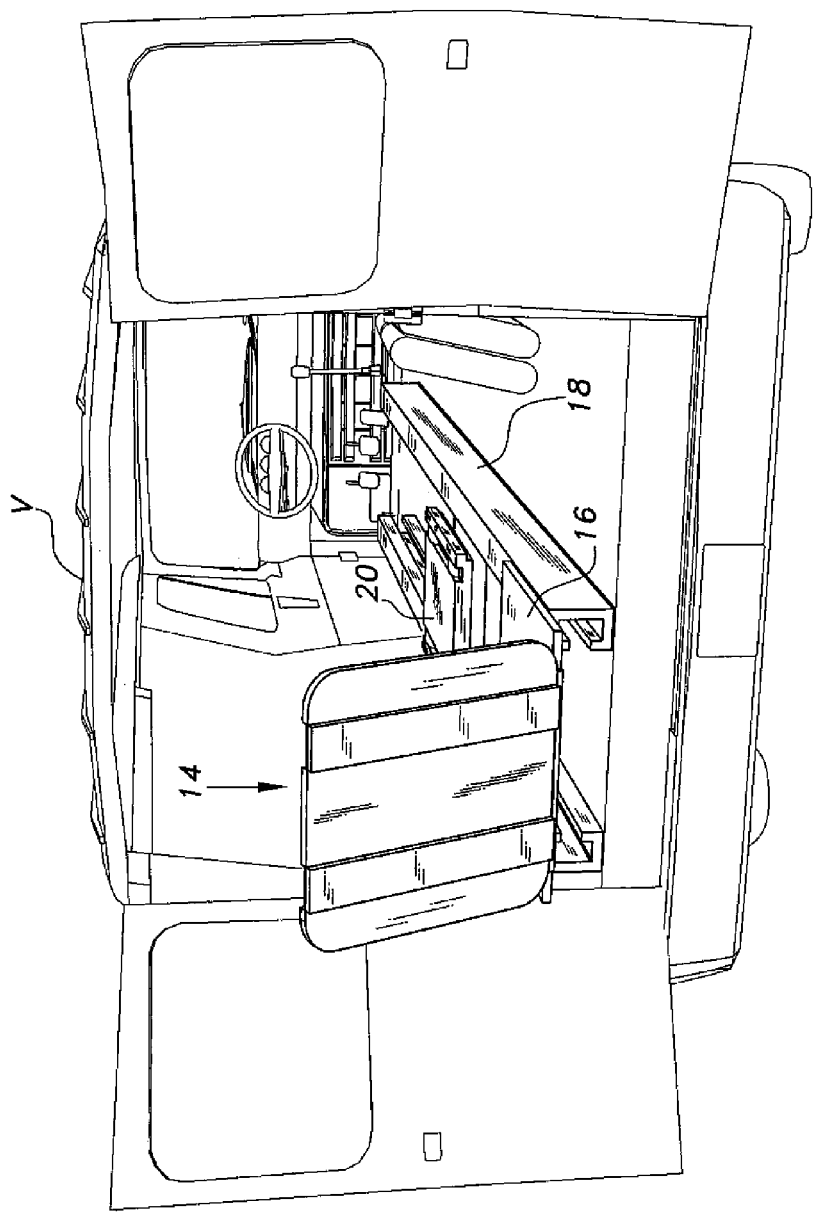
FIG. 6 is a rear perspective view of the vehicle with wheelchair-positioning mechanism of FIG. 1, shown with the wheelchair lift in a folded position.
Figure 7:
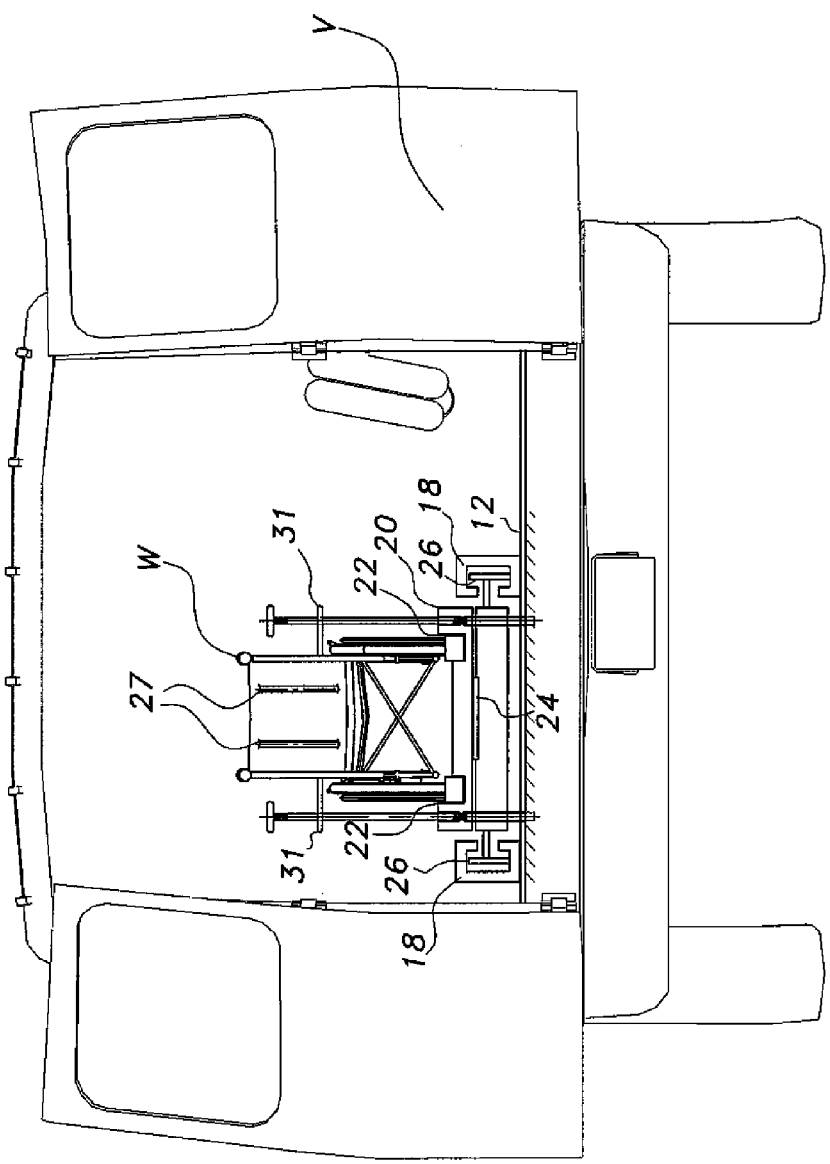
FIG. 7 is a partial rear view of the vehicle with wheelchair-positioning mechanism of FIG. 2, showing the arrangement of the wheelchair moving member and rail system.

In use, employing the remote control device R, the lift 14 is deployed in its unfolded position (FIG. 2) so that the disabled person can maneuver the wheelchair onto the loading platform 14a. The platform 14a is raised to coincide with off-load ramp 16 (FIG. 3) and the wheelchair is maneuvered via ramp 16 onto the platform 20 with the rear wheels of the wheelchair disposed in the grooves 22 between the semi-cylindrical protuberances 23. The trolley or carriage 32 is energized to propel the platform 20 (and wheelchair) forward to a position adjacent the driving controls of the vehicle. The stabilizing bars 25 are inserted and attached to the floor 12 of the vehicle V to secure the wheelchair in a stable position. To exit the vehicle, the stabilizing bars 25 are retracted from the floor 12 and platform 20 is rotated 180° so that the occupant of the wheelchair now faces rearward in the vehicle compartment. The carriage 32 propels the platform 20 toward the rear of the vehicle V (FIG. 5). Loading platform 14a is again raised to coincide with off-load ramp 16 and is lowered once the wheelchair has been positioned thereon.

It is to be understood that the present invention is not limited to the embodiments described above, but encompasses any and all embodiments within the scope of the following claims.

I claim:

1. A vehicle with a wheelchair-positioning mechanism, comprising in combination:
    an automobile having a compartment, the compartment having a floor, a rear end, and a front end;
    a foldable wheelchair lift apparatus positioned adjacent the rear end of the compartment;
    driving control apparatus positioned adjacent the front end of the compartment;
    a rail system disposed on the floor and extending from the rear end adjacent the wheelchair lift apparatus to the front end adjacent the driver control apparatus, the rail system including a pair of spaced, parallel C-shaped rails;
    a motorized carriage mounted on the rail system for movement thereon from the rear end adjacent the wheelchair lift apparatus to the front end adjacent the driver control apparatus;
    a motorized wheelchair receiving platform mounted on the motorized carriage, the motorized wheelchair receiving platform having an upper surface and a lower surface mounted to a motorized member, the motorized wheelchair receiving platform being selectively rotatable through 360° in a horizontal plane;
    a pair of parallel longitudinal grooves formed in the upper surface for receiving rear wheels of the wheelchair, each of the longitudinal grooves having a front end and a rear end;
    wherein the grooves form parallel channels in the upper surface; and
    a respective semi-cylindrical protuberance disposed in each of the grooves at each of the respective front ends and rear ends to prevent the wheelchair from easily rolling out of the grooves.

2. The vehicle according to claim 1, further including means for stabilizing the wheelchair when the wheelchair-receiving platform is adjacent said driving control apparatus.

3. The vehicle according to claim 1 wherein said wheelchair lift apparatus includes:
    a pair of risers having upper ends and lower ends;
    a wheelchair loading platform vertically movable on the risers from the lower ends to the upper ends; and
    an off-load ramp adjacent the upper ends of the risers, the off-load ramp traversing a space between the upper ends of the risers and the pair of rails.

4. The vehicle according to claim 1, wherein said carriage is constrained to forward and rearward movement in the vehicle compartment, said platform being selectively rotatable to permit an occupant to alternately face forward and rearward in the compartment.

5. The vehicle according to claim 1, further including a control device for remotely operating said chair lift apparatus, said carriage, and said wheelchair receiving platform.

6. A vehicle with a wheelchair-positioning mechanism, comprising in combination:
    an automobile having a compartment, the compartment having a floor, a rear end, and a front end;
    a foldable wheelchair lift apparatus positioned adjacent the rear end of the compartment;
    driving control apparatus positioned adjacent the front end of the compartment;
    a rail system disposed on the floor and extending from the rear end adjacent the wheelchair lift apparatus to the front end adjacent the driver control apparatus, the rail system including a pair of spaced, parallel C-shaped rails;
    a motorized carriage mounted on the rail system for movement thereon from the rear end adjacent the wheelchair lift apparatus to the front end adjacent the driver control apparatus, the carriage having a motorized wheelchair receiving platform mounted thereon, the motorized wheelchair receiving platform having an upper surface and a lower surface, the platform being selectively rotatable through 360° in a horizontal plane;
    a pair of parallel longitudinal grooves formed in the upper surface for receiving rear wheels of the wheelchair, each of the longitudinal grooves having a front end and a rear end;
    a respective semi-cylindrical protuberance disposed in each of the grooves at each of the respective front ends and rear ends to prevent the wheelchair from easily rolling out of the grooves; and
    means for stabilizing the wheelchair when the wheelchair receiving platform is adjacent the driving control apparatus;
    wherein said means for stabilizing including a pair of exteriorly threaded stabilizing bars, a pair of support members adapted for attachment to the wheelchair for receiving the stabilizing bars therethrough, and openings defined in said wheelchair receiving platform and said floor for receiving the stabilizing bars therein.

7. The vehicle according to claim 6, wherein the openings in said floor are threaded openings.

8. The vehicle according to claim 7, further including receptacles adapted for mounting on the wheelchair for retaining the stabilizer bars therein when the bars are not in use.

\* \* \* \* \*